United States Patent
Barguet et al.

(10) Patent No.: US 8,209,949 B2
(45) Date of Patent: *Jul. 3, 2012

(54) WIRE ROPE FOR A TIRE

(75) Inventors: Henri Barguet, Les Martres D'Artiere (FR); Thibaud Pottier, Malauzat (FR); Denis Alvarez, Clermont-Ferrand (FR); Christian Signoret, Cournon-D'Auvergne (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/971,979

(22) Filed: Dec. 17, 2010

(65) Prior Publication Data
US 2011/0143160 A1    Jun. 16, 2011

Related U.S. Application Data

(63) Continuation of application No. 11/596,226, filed as application No. PCT/EP2005/005086 on May 11, 2005, now abandoned.

(30) Foreign Application Priority Data

May 12, 2004    (FR) .................................. 04 05162

(51) Int. Cl.
*D02G 3/48* (2006.01)

(52) U.S. Cl. .................................................. 57/212

(58) Field of Classification Search ............. 57/212, 57/902; 152/556, 557
See application file for complete search history.

(56) References Cited

U.S. PATENT DOCUMENTS

| | | | |
|---|---|---|---|
| 4,690,191 | A | 9/1987 | Kawasaki |
| 4,986,327 | A | 1/1991 | Takahira |
| 5,327,713 | A | 7/1994 | Sakon |
| 2008/0066843 | A1 | 3/2008 | Alvarez et al. |

FOREIGN PATENT DOCUMENTS

| | | |
|---|---|---|
| EP | 0 301 776 A | 2/1989 |
| EP | 0 751 015 A | 1/1997 |
| EP | 1 277 600 A | 1/2003 |
| GB | 316 142 A | 5/1930 |
| GB | 2 080 845 A | 2/1982 |

*Primary Examiner* — Shaun R Hurley
(74) *Attorney, Agent, or Firm* — Cozen O'Connor (57) ABSTRACT

Metal cable having two layers of construction 4+N comprising an inner layer C1 of 4 wires of diameter $d_1$ wound together in a helix at a pitch $p_1$, this layer C1 itself being surrounded by an outer layer C2 of N wires of diameter $d_2$ wound together in a helix at a pitch $p_2$, characterized in that said cable furthermore has the following characteristics ($d_1$, $d_2$, $p_1$ and $p_2$ in mm):
$0.25 < d_1 < 0.40$;
$0.25 < d_2 < 0.40$;
$3.5 < p_1 < 7 < p_2 < 14$.
Such a cable, of preferred construction 4+9, is in particular usable for reinforcing tires, in particular as an anchoring means for a carcass reinforcement of a tire without a solid bead wire.

20 Claims, 3 Drawing Sheets

WIRE ROPE FOR A TIRE

RELATED APPLICATION

This application is a continuation of U.S. application Ser. No. 11/596,226 filed Feb. 14, 2008, which is the U.S. National Stage of International Application No. PCT/EP2005/005086 filed May 11, 2005, which claims priority from French Application No. 04/05162 filed May 12, 2004.

FIELD OF THE INVENTION

The present invention relates to metal layered cables usable for manufacturing tires, in particular for reinforcing their beads enabling these tires to be fixed to a vehicle wheel rim.

BACKGROUND OF THE INVENTION

Patent specification EP-A-582 196 was the first to describe a tire comprising a crown surmounted by a tread, a crown reinforcement, two sidewalls and two beads, a carcass reinforcement passing into the two sidewalls and anchored by means for anchoring in the beads, in which the carcass reinforcement comprises at least one circumferential alignment of reinforcing members (referred to as 'radial') oriented radially, arranged adjacently and practically parallel to one another, aligned circumferentially in at least one circumferential alignment from the beads towards the sidewalls, and in which the anchoring means of these radial reinforcing members comprise at least one circumferentially oriented reinforcing member (referred to as 'anchoring reinforcing member') axially bordering said circumferential alignments of said radial reinforcing members and cooperating with an adjacent portion of the carcass reinforcement by means of an appropriate rubber composition (referred to as 'anchoring rubber'), of great hardness, in contact with the anchoring reinforcing member and the adjacent lengths of the first radial reinforcing members, and transmitting the forces between the radial reinforcing members and the anchoring reinforcing members. For the detailed description of such tires, which are referred to as "bead-wire-less" because they do not have a conventional solid bead wire, of a relatively large diameter, around which the carcass reinforcement usually winds, reference may also be made, by way of examples, to patent specifications EP-A-664 231, EP-A-664 232, EP-A-664 233 (or U.S. Pat. No. 5,660,656), WO-A-98/54006 or WO-A-2004/009380.

Although this new tire bottom-zone architecture has yielded excellent results, in particular in terms of endurance, it has however been noted that the great rigidity of the beads could cause difficulties when mounting and/or demounting the tires, in particular during manual operations, this problem being particularly true for tires of large dimensions such as for example heavy-vehicle tires.

It will be recalled here that that the conventional mounting process of a "tubeless" tire on a generally integral rim comprising a hollow base consists of passing part of the first bead over the rim flange and placing this part in the hollow base, then passing the rest of the bead over the flange due to slight ovalisation of the corresponding bead of the tire, and repeating the same operation to pass the second bead over the flange of the rim. The mounting is then terminated by a final stage of inflation to a pressure such that it ensures that the beads are put in position on the seats bearing on the rim flanges; during this last stage, the beads may cross "humps" which form an obstacle to the passage of said beads as far as their respective seats and then prevent the risks of unseating.

To overcome this problem of mounting ability, it was proposed first of all, according to what is taught by patent specification EP-A-751 015 (or U.S. Pat. No. 5,702,548), to use anchoring cables of high non-structural elongation, in particular layered cables of construction (2+7) or (3+8), which have undergone a specific heat treatment. These cables, which are said to be of "high-elongation" type, are characterised, before and after curing of the tire, by a particularly high operational elongation (total of their elastic elongation Ae and of their plastic elongation Ap), greater than 4%. However, such an elongation is obtained at the cost of what is called a recovery annealing heat treatment, carried out at a low temperature of between 250° C. and $Ac_1$ (temperature corresponding to a transformation of the crystalline structure of the steel), which has the disadvantage of being relatively complex and expensive.

Still in order to overcome this problem of mounting ability, patent application EP-A-1 277 600 did propose another, more economic, solution, consisting of using a rubber composition of reduced rigidity, having an elasticity modulus of between 10 and 20 MPa at a deformation of 10%, and a high creep resistance due to a specific formulation, as anchoring rubber. It is however noted nowadays that a relatively low rigidity of the anchoring rubber can adversely affect somewhat the road behaviour of vehicles fitted with such tires, in particular under sports running conditions; this is the case in particular for top-of-range passenger vehicles, the user of which wishes to have a very high level of road behaviour, in all circumstances, without compromise on safety, in particular on the grip properties, nor on the life of the tires.

SUMMARY OF THE INVENTION

In continuing its research, the Applicant has discovered a novel layered cable, each layer having in particular a high twist (or very short assembly pitches), which makes it possible to improve the existing compromises in terms of mounting ability of the tires and of road behaviour, without necessitating modifying the architecture of the bottom zone of the bead-wire-less tires.

Consequently, a first subject of the invention relates to a metal cable having two layers of construction 4+N comprising an inner layer C1 of 4 wires of diameter $d_1$ wound together in a helix at a pitch $p_1$, this layer C1 itself being surrounded by an outer layer C2 of N wires of diameter $d_2$ wound together in a helix at a pitch $p_2$, characterised in that said cable furthermore has the following characteristics ($d_1$, $d_2$, $p_1$ and $p_2$ in mm):

0.25<$d_1$<0.40;
0.25<$d_2$<0.40;
3.5<$p_1$<7<$p_2$<14.

Owing to this specific cable, the beads of the bead-wireless tires are advantageously ovalisable, that is to say deformable in their plane, under industrially acceptable forces; these beads can furthermore be more easily warped, that is to say that their perimeter is more easily deformable, in the axial direction. These properties very substantially improve the ability of the tire of the invention to be ovalised and therefore its mounting ability; it is henceforth possible to use anchoring rubbers of great hardness, which are beneficial to road behaviour, without necessarily having to use "high-elongation" treated cables.

The invention also relates to the use of such a cable as a reinforcing element for articles or semi-finished products of plastics material and/or of rubber intended in particular for any ground contact system for automobiles, such as tires, internal safety supports for tires, wheels, rubber springs, elastomeric joints, and other suspension and anti-vibration elements, and also to these articles or semi-finished products themselves.

The tires of the invention may be intended for vehicles of passenger-vehicle type, 4×4s, "SUVs" (Sport Utility Vehicles), but also for two-wheeled vehicles such as motorcycles, or for industrial vehicles selected from among vans, "heavy vehicles"—i.e. subway trains, buses, road transport machinery (lorries, tractors, trailers), off-road vehicles—, agricultural machinery or construction machinery, aircraft and other transport or handling vehicles.

By way of example of a preferred application, the cable of the invention may be used for reinforcing a crown reinforcement, a carcass reinforcement or alternatively, more preferably, the bead zone of such tires.

I. DEFINITIONS AND TESTS

I-1. Definitions

In the present application, the following are understood to mean in known manner:

"axial": a direction parallel to the axis of rotation of the tire; this direction may be "axially inner" when it is directed towards the inside of the tire and "axially outer" when it is directed towards the outside of the tire;

"bead": the portion of the tire adjacent radially internally to the sidewall and the base of which is intended to be mounted on a rim seat of a vehicle wheel;

"diene elastomer (or inaccurately rubber)": an elastomer resulting at least in part (that is to say a homopolymer or a copolymer) from diene monomer(s) (monomer(s) bearing two double carbon-carbon bonds, whether conjugated or not);

"essentially saturated diene elastomer": a diene elastomer resulting at least in part from conjugated diene monomers, having a content of members or units of diene origin (conjugated dienes) which is less than 15% (mole %);

"essentially saturated diene elastomer": a diene elastomer resulting at least in part from conjugated diene monomers, having a content of members or units of diene origin (conjugated dienes) which is greater than 15% (mole %);

"highly unsaturated diene elastomer": a diene elastomer of the essentially saturated type, having a content of members or units of diene origin (conjugated dienes) which is greater than 50% (mole %);

"isoprene elastomer": an isoprene homopolymer or copolymer, in other words a diene elastomer selected from the group consisting of natural rubber (NR), synthetic polyisoprenes (IR), the various isoprene copolymers and mixtures of these elastomers;

"sidewall": the portion of the tire, most frequently of low flexural strength, located between the crown and the bead;

"radial": a direction passing through and perpendicular to the axis of rotation of the tire; this direction may be "radially inner" or "radially outer" according to whether it is directed towards the axis of rotation of the tire or towards the outside of the tire;

"reinforcement element" or "reinforcing member": equally well monofilaments and multifilaments, or assemblies such as cables, plied yarns or any other equivalent type of assembly, whatever the material and the treatment of these reinforcing members, for example surface treatment or coating such as rubber-coating, or alternatively pre-sizing in order to promote adhesion to the rubber;

"circumferentially oriented reinforcing member" or "circumferential reinforcing member": a reinforcing member oriented substantially parallel to the circumferential direction of the tire, that is to say forming with this direction an angle which does not deviate by more than five degrees from the circumferential direction;

"radially oriented reinforcing member" or "radial reinforcing member": a reinforcing member contained substantially within one and the same axial plane or within a plane forming with an axial plane an angle less than or equal to 10 degrees.

I-2. Tests

A) Dynamometric Measurements

As regards the wires and metal cables, the measurements of breaking load Fm (maximum load in N), tensile strength Rm (in MPa) and elongation at break At (total elongation in %) are carried out under tension in accordance with Standard ISO 6892 of 1984.

As regards the rubber compositions, the modulus measurements are carried out under tension, unless indicated otherwise in accordance with Standard ASTM D 412 of 1998 (test piece "C"): the true secant moduli (or Young's moduli), reduced to the real section of the test piece at 10% elongation, referred to as E10 and expressed in MPa, are measured in a second elongation (that is to say after an accommodation cycle) (normal conditions of temperature and humidity in accordance with Standard ASTM D 1349 of 1999).

B) Static Creep Test

The so-called "static creep" test is a test in which test pieces of rubber composition the useful part of which has a length of 70 mm, a width of 5 mm and a thickness of 2.5 mm (these test pieces are cut from vulcanised sheets of a thickness of 2.5 mm) are prepared; the test pieces are placed in an oven at 150° C. and a 3 kg weight is immediately hung from them; the test is thus carried out with an initial stress of:

$$\sigma_0 = \frac{Mg}{S_0} = 2.35 \text{ MPa}$$

where M is: weight applied, g is: gravity acceleration and $S_0$ is: initial section of the test piece being measured; the elongation of the useful part of the test piece is measured as a function of time; the "amount of static creep" corresponds to the variation of deformation over a given time, for example between 3 and 5 hours' testing:

$$\tau = \frac{\Delta \varepsilon}{\Delta t}$$

where: $\Delta \varepsilon = \varepsilon(t_2) - \varepsilon(t_1)$: variation in the deformation measured during $\Delta t = t_2 - t_1$ in minutes (min).

C) Rheometry Test

The "rheometry" test is an alternating shearing test at a deformation of ±0.2 degrees, a frequency of 100 cycles/min., a temperature of 197° C. and a duration of 10 min (rheometer from Monsanto). The test is carried out on a disc of uncured rubber composition, the change in the torque resulting from the shearing imposed between the two faces of the disc over the min. is recorded and the change in the torque after the maximum measured is noted: if the torque measured remains stable, there is no reversion, that is to say, reduction in the stiffness of the test piece; if the torque measured decreases, there is reversion. The phenomenon of reversion results in a reduction in the rigidity of the test piece under the test conditions; it is therefore a test of the thermal stability of the mix at high temperature.

$$r = \frac{C_{max} - C_{10}}{C_{max}} \times 100$$

denotes the amount of reversion at the end of the test; $C_{max}$ is the maximum torque measured and $C_{10}$ is the torque measured after 10 min.

II. DETAILED DESCRIPTION OF THE INVENTION

In the present description, unless expressly indicated otherwise, all the percentages (%) indicated are mass %.

II-1. Layered Cable 4+N

The metal cable according to the invention is a cable having two layers of construction 4+N comprising a core or inner layer (C1) of 4 wires of diameter $d_1$ wound together in a helix at a pitch $p_1$, this layer C1 itself being surrounded by an outer layer (C2) of N wires of diameter $d_2$ wound together in a helix at a pitch $p_2$, this cable furthermore having the following characteristics ($d_1$, $d_2$, $p_1$ and $p_2$ in mm):

0.25<$d_1$<0.40;
0.25<$d_2$<0.40;
3.5<$p_1$<7<$p_2$<14.

All the above characteristics are of course measured when the cable is at rest and its axis rectilinear.

"Metal cable" is understood here by definition to mean a cable formed of wires made majoritarily (that is to say to more than 50% of these wires) or fully (for 100% of the wires) of a metallic material.

The wires of layers C1 and C2 may have a diameter which is identical or different from one layer to the other. Preferably wires of the same diameter from one layer to the other (i.e. $d_1$=$d_2$) are used, in particular to simplify the cabling process, as shown, for example, in the appended FIG. 3.

It will be recalled here that in known manner the pitch "p" represents the length, measured parallel to the axis of the cable, at the end of which a wire having this pitch makes a complete turn around said axis of the cable.

Using different pitches $p_1$ and $p_2$ means that, in known manner, the wires of the layers C1 and C2 are essentially arranged in two cylindrical (or tubular), adjacent and concentric layers, such that, at least in the cable at rest, the thickness of the outer layer C2 is substantially equal to the diameter of the wires which constitute it; as a result, the cross-sections of the inner layer C1 and of the outer layer C2, like that of the cable, have an outer enveloping surface or a contour (denoted for example E1 and E2 respectively in FIGS. 3 and 4) which is substantially circular.

The cables having cylindrical or tubular layers must in particular not be confused with what are called "compact" layered cables, which are assemblies of wires wound with the same pitch and in the same direction of twist; in such cables, the compactness is such that practically no distinct layer of wires is visible; as a result, the cross-section of such cables has a contour which is no longer circular, but polygonal.

Preferably, the layers C1 and C2 are wound in the same direction of twist (either S/S or Z/Z), which has the significant advantage of minimising the contact pressure between the wires.

Preferably, the layer C2 of the cable of the invention comprises from 8 to 12 cords (8≦N≦12), more preferably from 8 to 10 cords (8<N≦10).

According to another preferred embodiment of the invention, for better ability of the cables to be penetrated by the anchoring rubber, the outer layer C2 is a tubular layer of N wires referred to as "unsaturated" or "incomplete", that is to say that, by definition, there is sufficient space in this tubular layer C2 to add at least one (N+1)th wire of diameter $d_2$, several of the N wires possibly being in contact with each other, Reciprocally, this tubular layer C2 would be referred to as "saturated" or "complete" if there was not sufficient space in this layer to add at least one (N+1)th wire of diameter $d_2$.

Figure 3:
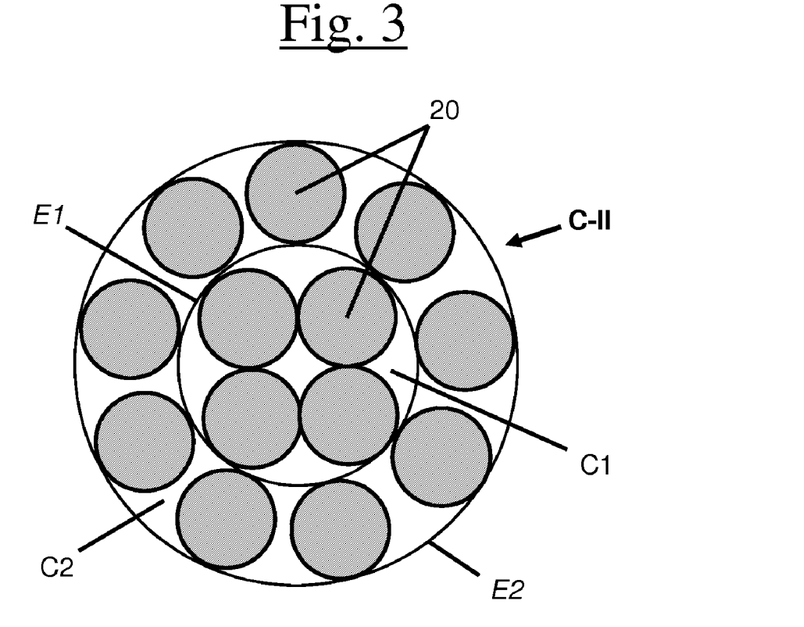
FIG. 3 shows a cross-section of cables of constructions 4+9 usable in the anchoring zone.

FIG. 3 shows, in a section perpendicular to the axis of the cable (assumed to be rectilinear and at rest), an example of a preferred cable of construction 4+9 (cable denoted C-II in the following examples). The inner layer C1, which is formed of four wires 20 wound together in a helix at a pitch $p_1$, is itself surrounded by and in contact with an outer layer C2 of nine wires 20 wound together in a helix at a pitch $p_2$, and therefore of a thickness substantially equal to the diameter $d_2$ of said wires. It can clearly be seen that the wires 20 are thus arranged in two adjacent, concentric, tubular layers (layer C1 of contour E1, and layer C2 of contour E2).

According to a preferred embodiment of the invention, the following characteristics are satisfied ($d_1$, $d_2$, $p_1$ and $p_2$ in mm):

0.30<$d_1$<0.40;
0.30<$d_2$<0.40;
4.0<$p_1$<7 and 8<$p_2$<14.

It is within these narrow ranges of diameters $d_1$ and $d_2$ on one hand, and of short pitches $p_1$ and $p_2$ on the other hand, that the best compromise of performances has been obtained. More preferably still, for these same reasons, the following relationships are satisfied ($p_1$ and $p_2$ in mm):

4.5≦$p_1$≦6.5 and 8.5≦$p_2$≦13.5.

The total elongation at break (At) of the cable, the total of its structural, elastic and plastic elongations (At=As+Ae+Ap), is preferably greater than 2.5%, more preferably greater than 3.0%, even more preferably greater than 3.5%.

The present cable could also be high-elongation treated, to impart thereto an operational elongation Af (Af=Ae+Ap) of greater than 4%, preferably greater than 5%, more preferably still greater than 6%. It will be recalled that such a treatment may consist of a heat treatment by Joule effect, by static convection or alternatively by induction, performed directly on the cable, as described in the aforementioned application EP-A-751 015.

The invention is preferably carried out with a steel cable, more preferably one made of perlitic (or ferrito-perlitic) carbon steel hereinafter referred to as "carbon steel", or alternatively of stainless steel (by definition, steel comprising at least 11% chromium and at least 50% iron) such as are described for example in applications EP-A-648 891 or WO-A-98/41682. However, it is of course possible to use other steels or other alloys.

The metal or steel used, be it in particular a carbon steel or a stainless steel, may itself be coated with a metallic layer which improves for example the processing properties of the metal cable and/or its constituent elements, or the use properties of the cable and/or of the tire themselves, such as the properties of adhesion, corrosion resistance or alternatively ageing resistance.

According to a preferred embodiment, the steel used is covered with a layer of brass (Zn—Cu alloy) or of zinc; it will be recalled that during the process of manufacturing the wires, the brass or zinc coating facilitates the drawing of the wire, as well as the sticking of the wire to the rubber. However, the wires could be covered with a fine metal layer other than brass or zinc, having for example the function of improving the corrosion resistance of these wires and/or the adhesion thereof to the rubber, for example a fine layer of Co, Ni, Al, or of an alloy of two or more of the compounds Cu, Zn, Al, Ni, Co, Sn.

When the cables of the composites of the invention are used for reinforcing beads of bead-wire-less tires, they are preferably made of carbon steel and have a tensile strength (Rm) greater than 2000 MPa.

The person skilled in the art will know how to manufacture carbon steel wires having such strength, by adjusting in particular the composition of the steel and the final work-hardening ratios of these wires, according to his own particular needs, using for example micro-alloyed carbon steels containing specific alloying elements such as Cr, Ni, Co, V, or various other known elements (see for example *Research Disclosure* 34984—"*Micro-alloyed steel cord constructions for tires*"—May 1993; *Research Disclosure* 34054—"*High tensile strength steel cord constructions for tires*"—August 1992).

When a carbon steel is used, its carbon content is preferably of between 0.1% and 1.2%, in particular between 0.5% and 1.1%. It is more preferably of between 0.6% and 1.0% (% by weight of steel), such a content representing a good compromise between the mechanical properties required for the composite and the feasibility of the wires.

The cable presently described might be provided with an external wrap, formed for example of a single wire, whether or not of metal, wound in a helix about the cable at a pitch shorter than that of the outer layer, and in a direction of winding opposite or identical to that of this outer layer. However, owing to its specific structure, the cable of the invention, which is already self-wrapped, does not generally require the use of an external wrapping wire, which advantageously solves the problems of wear between the wrap and the wires of the outermost layer of the cable.

The layered cable previously described is manufactured using cabling devices and using processes well-known to the person skilled in the art which are not described here in order to simplify the description. Owing to the different pitches $p_1$ and $p_2$, it requires two successive operations (manufacture of the first, inner, layer C1 then cabling of the second, outer, layer C2 around this layer C1), these two operations possibly advantageously being effected in-line using two cablers (for example Barmag cablers) arranged in series.

II-2. Use in a Rubber Matrix

The cables according to the invention are particularly intended for reinforcing the bead zones of tires, in particular tires without a solid bead wire such as described in the aforementioned patent specifications, as anchoring cables for the carcass reinforcements of such tires.

Advantageously, such a cable, oriented circumferentially, cooperates with an adjacent portion of the carcass reinforcement by means of a rubber composition or diene elastomer (as "anchoring rubber") in contact with said cable and said carcass reinforcement.

The diene elastomers, in known manner, may be classed in two categories, those referred to as essentially unsaturated and those referred to as essentially saturated. Thus, for example, butyl rubbers or copolymers of dienes and of alpha-olefins of the EPDM type fall within the definition of essentially saturated diene elastomers (low or very low content of units of diene origin which is always distinctly less than 15%).

Although it is applicable to any type of diene elastomer, the person skilled in the art of tires will readily understand that the present invention is preferably used with diene elastomers of the highly unsaturated type.

The diene elastomer is in particular selected from among the group consisting of polybutadienes (BR), natural rubber (NR), synthetic polyisoprenes (IR), the various butadiene copolymers, the various isoprene copolymers and mixtures of these elastomers. Such copolymers are more preferably selected from the group consisting of butadiene/stirene copolymers (SBR), whether the latter be prepared by emulsion polymerisation (ESBR) or by solution polymerisation (SSBR), isoprene/butadiene copolymers (BIR), isoprene/stirene copolymers (SIR) and isoprene/butadiene/stirene copolymers (SBIR).

More preferably at least one isoprene elastomer is used, even more preferably natural rubber or a synthetic polyisoprene of the cis-1,4 type; of these synthetic polyisoprenes, preferably polyisoprenes having a content (mole %) of cis-1,4 bonds greater than 90%, more preferably still greater than 98%, are used.

The isoprene elastomer may be used on its own or in a blend with other diene elastomers, in particular SBR and/or BR elastomers such as those mentioned above, whether or not the isoprene elastomer be present in a majority proportion among all the diene elastomers used.

Thus, according to a specific embodiment of the invention, it is possible to use for example, in a blend with the isoprene elastomer (in particular natural rubber), an SBR copolymer having a Tg (glass transition temperature, measured in accordance with ASTM D3418) of preferably between −70° C. and −10° C., whether it be prepared in emulsion (E-SBR) or in solution (S-SBR), in a proportion of 0 to 70 phr (parts by weight per hundred parts of elastomer), the remainder (namely 30 to 100 phr) being constituted by the isoprene elastomer. In that case, more particularly an SSBR is used. There may also be associated with said SBRs a BR having preferably more than 90% (mole %) of cis-1,4 bonds, said BR having a Tg preferably between −110° C. and −50° C.

Finally, the diene elastomer(s) may be used in association with any type of synthetic elastomer other than a diene elastomer, or even with polymers other than elastomers, for example thermoplastic polymers.

Such a composition furthermore comprises all the conventional constituents usually used in rubber matrices intended in particular for the manufacture of bottom zones of tires, such as for example reinforcing fillers such as carbon black or inorganic fillers such as silica, inorganic-filler coupling agents, anti-ageing agents, antioxidants, plasticising agents or extender oils, whether the latter be aromatic or non-aromatic in nature (in particular oils which are only very slightly or not aromatic, for example of naphthenic or paraffinic type, of high or preferably low viscosity, MES or TDAE oils), agents which facilitate processing (processability) of the compositions in the uncured state, stearamides, tackifying resins, a cross-linking system based on either on sulphur, or on sulphur and/or peroxide donors, vulcanisation accelerators, activators or retarders, anti-reversion agents such as for example sodium hexathiosulphonate or N,N'-m-phenylene-biscitraconimide, methylene acceptors and donors, reinforcing resins, bismaleimides, known adhesion-promoting systems of the type "RFS" (resorcinol/formaldehyde/silica) or metal salts, in particular cobalt or nickel salts.

The person skilled in the art will be able, in the light of the present description, to adjust the formulation of the rubber composition in order to achieve the desired levels of rigidity (elasticity modulus), and to give excellent high-temperature creep resistance and very good high-temperature stability.

The creep resistance is essential in obtaining solid and durable anchoring of the carcass reinforcements in the beads and the high-temperature thermal stability is also important owing to the very harsh thermal conditions to which some tire beads may be subjected during operation, in particular those for heavy-vehicle tires, whether road tires or not.

Thus, preferably, the anchoring rubber withstands without breaking a static creep stress at 150° C. under an initial stress of 2.35 MPa for at least 5 hours; more preferably, its amount of static creep at 150° C. under an initial stress of 2.35 MPa remains less than $2 \times 10^{-3}$/min for between 3 and 5 hours' applied stress. On the other hand and preferably, said rubber has an amount of reversion, after 10 min at 197° C., which is less than 10% and more preferably less than 5%.

The cross-linking system is preferably a vulcanisation system based on sulphur and a vulcanisation accelerator. Any compound capable of acting as a vulcanisation accelerator for the diene elastomers in the presence of sulphur may be used, in particular those selected from among the group consisting of 2-mercaptobenzothiazyl disulphide (abbreviated to "MBTS"), N-cyclohexyl-2-benzothiazyl sulphenamide (abbreviated to "CBS"), N,N-dicyclohexyl-2-benzothiazyl sulphenamide (abbreviated to "DCBS"), N-tert. butyl-2-benzothiazyl sulphenamide (abbreviated to "TBBS"), N-tert. butyl-2-benzothiazyl sulphenimide (abbreviated to "TBSI") and mixtures of these compounds. Preferably a primary accelerator of sulphenamide type is used.

To this vulcanisation system there are added, incorporated during the first, non-productive, phase and/or during the productive phase, various known secondary accelerators or vulcanisation activators such as zinc oxide, stearic acid, guanidine derivatives (for example diphenylguanidine), etc.

The sulphur is used in a preferred amount of between 3 and 15 phr (parts by weight per hundred parts of elastomer), more preferably of between 5 and 12 phr. The primary vulcanisation accelerator, for example a sulphenamide, is used in a preferred amount of between 0.5 and 7 phr, more preferably of between 1 and 5 phr.

The amount of reinforcing filler, for example carbon black or reinforcing inorganic filler such as silica, is preferably greater than 50 phr, for example of between 60 and 140 phr. It is more preferably greater than 70 phr, for example between 70 and 120 phr.

Suitable carbon blacks are all the carbon blacks, particularly blacks of the type HAF, ISAF and SAF conventionally used in tires (what are called tire-grade blacks). Of the latter, reference will more particularly be made to the reinforcing carbon blacks of series 100, 200 or 300 (ASTM grades), such as, for example, the blacks N115, N134, N234, N326, N330, N339, N347, N375, or alternatively, depending on the intended applications, the blacks of higher series (for example N660, N683, N772).

Suitable reinforcing inorganic fillers are in particular mineral fillers of siliceous type, in particular silica ($SiO_2$), or of aluminous type, in particular alumina ($Al_2O_3$). The silica used may be any reinforcing silica known to the person skilled in the art, in particular any precipitated or fumed silica having a BET surface area and a CTAB specific surface area both of which are less than 450 $m^2/g$, preferably from 30 to 400 $m^2/g$. As highly dispersible precipitated silicas (referred to as "HD"), mention will be made of for example the silicas Ultrasil 7000 and Ultrasil 7005 from Degussa, the silicas Zeosil 1165MP, 1135MP and 1115MP from Rhodia, the silica Hi-Sil EZ150G from PPG, and the silicas Zeopol 8715, 8745 and 8755 from Huber. Examples of reinforcing aluminas are the aluminas "Baikalox" "A125" or "CR125" from Baikowski, "APA-100RDX" from Condea, "Aluminoxid C" from Degussa or "AKP-G015" from Sumitomo Chemicals.

For coupling the diene elastomer to the reinforcing inorganic filler, if applicable, a coupling agent (or bonding agent) which is at least bifunctional which is intended in known manner to provide a sufficient chemical and/or physical connection between the inorganic filler (surface of its particles) and the diene elastomer, in particular bifunctional organosilanes or polyorganosiloxanes, is used.

The rubber composition or matrix has the preferred characteristic of having, in the vulcanised state, a secant tensile modulus, at 10% elongation (E10), which is greater than 20 MPa, more preferably greater than 30 MPa. It is within these ranges of rigidity, in particular between 40 and 70 MPa, that the best compromise of performances has been observed.

In the case of the greater rigidities, the rubber composition may advantageously comprise an additional reinforcing resin consisting for example of a methylene acceptor such as a phenol-formaldehyde resin, in a preferred amount of between 3 and 15 phr, more preferably of between 5 and 12 phr, and a methylene donor such as hexamethylenetetramine ("HMT") or alternatively hexamethoxymethylmelamine ("H3M"), in a preferred amount of between 1 and phr, more preferably of between 3 and 7 phr.

But the cable of the invention is also usable with an anchoring rubber of reduced rigidity, having in particular an elasticity modulus of between 10 and 20 MPa, as described for example in the aforementioned patent application EP-A-1 277 600.

II-3. Use in a Tire

The cable of the invention is advantageously usable for reinforcing a tire, in the form of a metal/rubber composite. Such a composite may be of varied forms, for example in the form of a ply, band, strip or series of strips, other blocks of rubber of varied forms and dimensions according to the intended applications, in which are incorporated or with which cooperate the 4+N cables previously described.

In this composite, the definitive adhesion between the metal and the rubber composition is obtained in known manner on emerging from the curing of the finished article, for example the tire, comprising the composite. Preferably this curing is effected under pressure.

Such a composite preferably constitutes part of a bead zone of a tire devoid of a conventional solid bead wire, said part of the bead zone being intended to anchor the carcass reinforcement of said tire.

Such a bead-wire-less tire, such as that described for example in terms of its general construction in the aforementioned documents EP-A-582 196, EP-A-664 231, EP-A-664 232, EP-A-664 233, WO-A-98/54006 or WO-A-2004/009380, generally comprises a crown surmounted by a tread, a crown reinforcement, a carcass reinforcement passing into the sidewalls and rejoining two beads designed to be mounted on the wheel rim of a vehicle. Said carcass reinforcement comprises first reinforcing members (or "radial reinforcing members") arranged adjacent and practically parallel to one another, aligned circumferentially in at least one circumferential alignment from at least one of said beads towards one of said sidewalls and anchored in said bead, the latter comprising an anchoring zone for holding the carcass reinforcement and comprising at least one second reinforcing member ("anchoring reinforcing member" or "anchoring cable") oriented circumferentially and cooperating with an adjacent portion of the carcass reinforcement by means of a rubber composition (or "anchoring rubber") in contact with the anchoring reinforcing member and the adjacent lengths of the first radial reinforcing members. In this tire, the cable and the anchoring rubber are as defined in sections II-1 and II-2 above.

The radial reinforcing members above are for example textile cabled yarns made of polyester (for example PET HMLS), PEN, rayon or other cellulose, nylon, aramid or alternatively of hybrid material (for example aramid/nylon).

Figure 1:
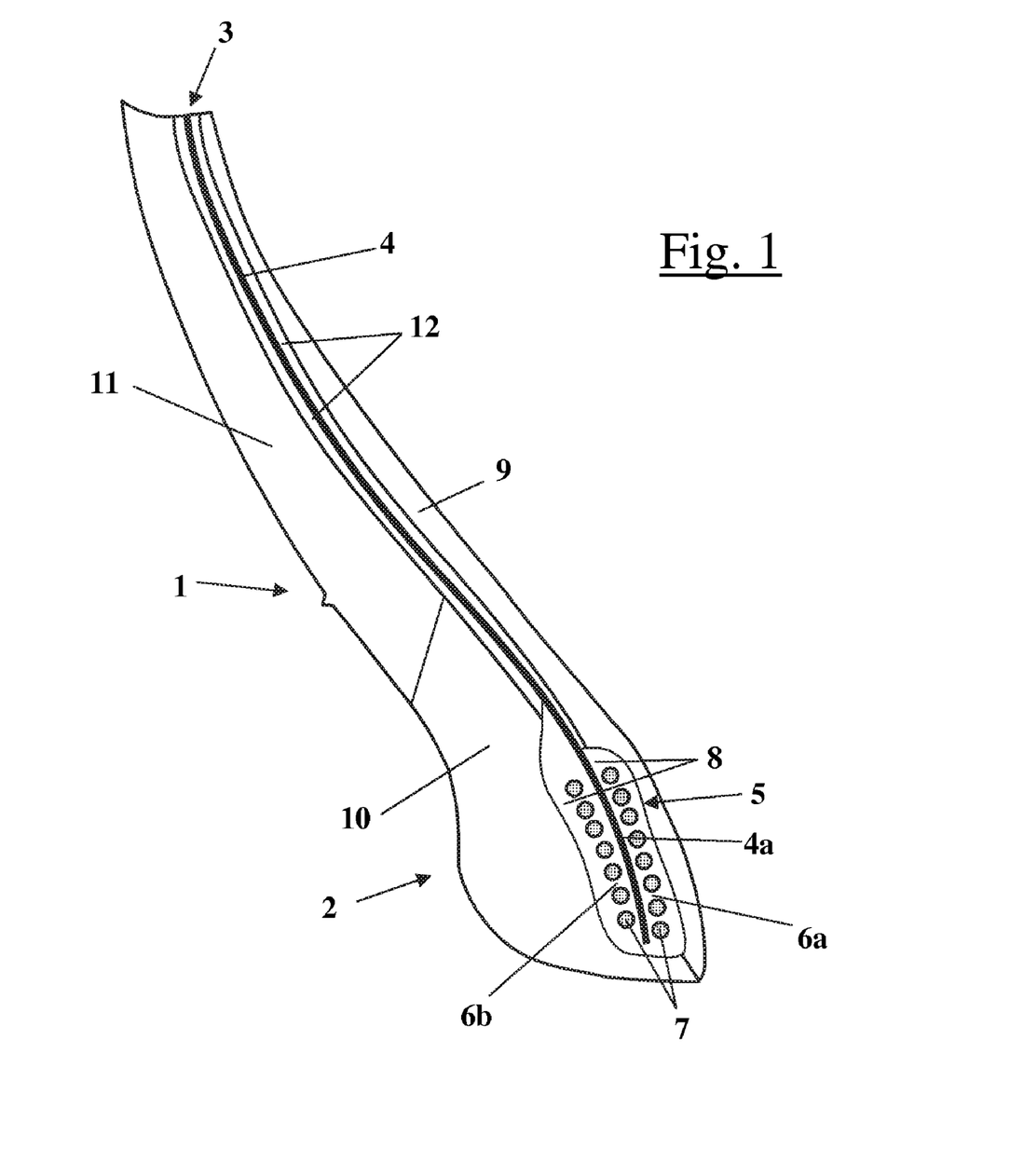
FIGS. 1 and 2 show two embodiments in partial cross-section depicting essentially a bottom zone of a bead-wireless tire, comprising in particular in its bead 2 an anchoring zone 5 of a carcass reinforcement 4.

By way of non-limitative example, there are depicted in FIG. 1, in partial cross-section, a bead and a sidewall of such a tire, in which the conventional anchoring, by turning up the carcass reinforcement about a solid bead wire; is replaced, it may be recalled, by an arrangement in which circumferential anchoring cables are arranged adjacent to the structure of radial reinforcing members, the whole being embedded in a rubber mix or anchoring rubber.

This tire comprises a sidewall 1 adjacent to a bead 2. A carcass reinforcement 3 extends circumferentially from the bead 2 towards the sidewall 1 and comprises in the example illustrated a circumferential alignment of first radial reinforcing members 4. This carcass reinforcement 3 may be arranged continuously from one bead to the other, passing through the sidewalls and the crown of the tire, or alternatively it may comprise two or more parts, arranged for example along the sidewalls, in particular without covering all of the crown. The radial reinforcing members 4, for example in this case textile cabled yarns of PET HMLS, are oriented radially in the beads and the sidewalls and are anchored in an anchoring zone 5 of the bead 2.

The anchoring zone 5 preferably comprises two circumferential windings or "stacks" 6a and 6b of second reinforcing members or anchoring cables 7 arranged on either side of the section 4a of the adjacent first radial reinforcing members 4, said stacks 6a and 6b cooperating with an anchoring rubber 8 in which they are incorporated.

This anchoring rubber 8 completely covers the length 4a of the radial reinforcing members 4, and the circumferential windings or stacks 6a and 6b of anchoring cable 7, so as to anchor the length 4a of the radial reinforcing members 4 securely in the anchoring zone 5 of the bead 2 and to take up the forces to which the first reinforcing members 4 are subjected due in particular to the inflation pressure of the tire. The stacks 6 may be produced for example by juxtaposition of a plurality of different circumferential cable elements 7, or by winding (substantially at zero degrees) one and the same cable 7 in a spiral, the turns of course being non-contiguous in any case. The anchoring cable 7 is a cable having two layers of construction 4+9 as illustrated in FIG. 3, according to the invention. The total number of these cables or windings of the same cable lies for example within a range from 10 to 25 approximately, for the two stacks 6a and 6b together.

By way of example, the average inter-cable (or inter-winding) distance is of the order of 0.3 mm; the minimum distance (to avoid any direct contact between the textile and metal) between the length 4a and each of the two stacks 6a and 6b is of between 0.5 and 0.8 mm.

Axially internally relative to the circumferential winding of anchoring cables 6a, there is a conventional rubber mix 9 as "internal rubber", the function of which is to provide tightness of the inside of the tire casing. Axially externally relative to the circumferential winding 6b of the anchoring cables, there is a protective mix 10, then, radially externally, a sidewall mix 11 which gradually replaces it. Radially externally to the anchoring zone 5, the radial reinforcing members 4 of the carcass reinforcement 3 are in direct contact with a mix 12.

The first reinforcing members 4 of this tire bead are therefore in contact with two different rubber mixes, the anchoring rubber 8 in the anchoring zone 5 and the mix 12 radially to the outside. The preferred mechanical characteristic of the anchoring rubber is an elasticity modulus (E10) greater than 20 MPa, whereas the mix 12 has a lesser rigidity, with a modulus of between 3 and 10 MPa.

In the anchoring zone 5 of the bead 2, the anchoring rubber 8 is the sole rubber mix in contact with the first 4 and second 7 reinforcing members. This anchoring rubber imparts to this structure excellent mechanical resistance to the forces to which it is subjected upon inflation of the tire and during travel.

FIG. 1, which has been commented on above, shows only a single preferred example of an anchoring structure of the bottom zone of a tire using the cable according to the invention.

The person skilled in the art will readily understand that a large number of other variants are possible, for example with anchoring zones 5 comprising three anchoring stacks 6a, 6b and 6c, one on either side of the length 4a of the radial reinforcing members 4, or more than three stacks.

Figure 2:
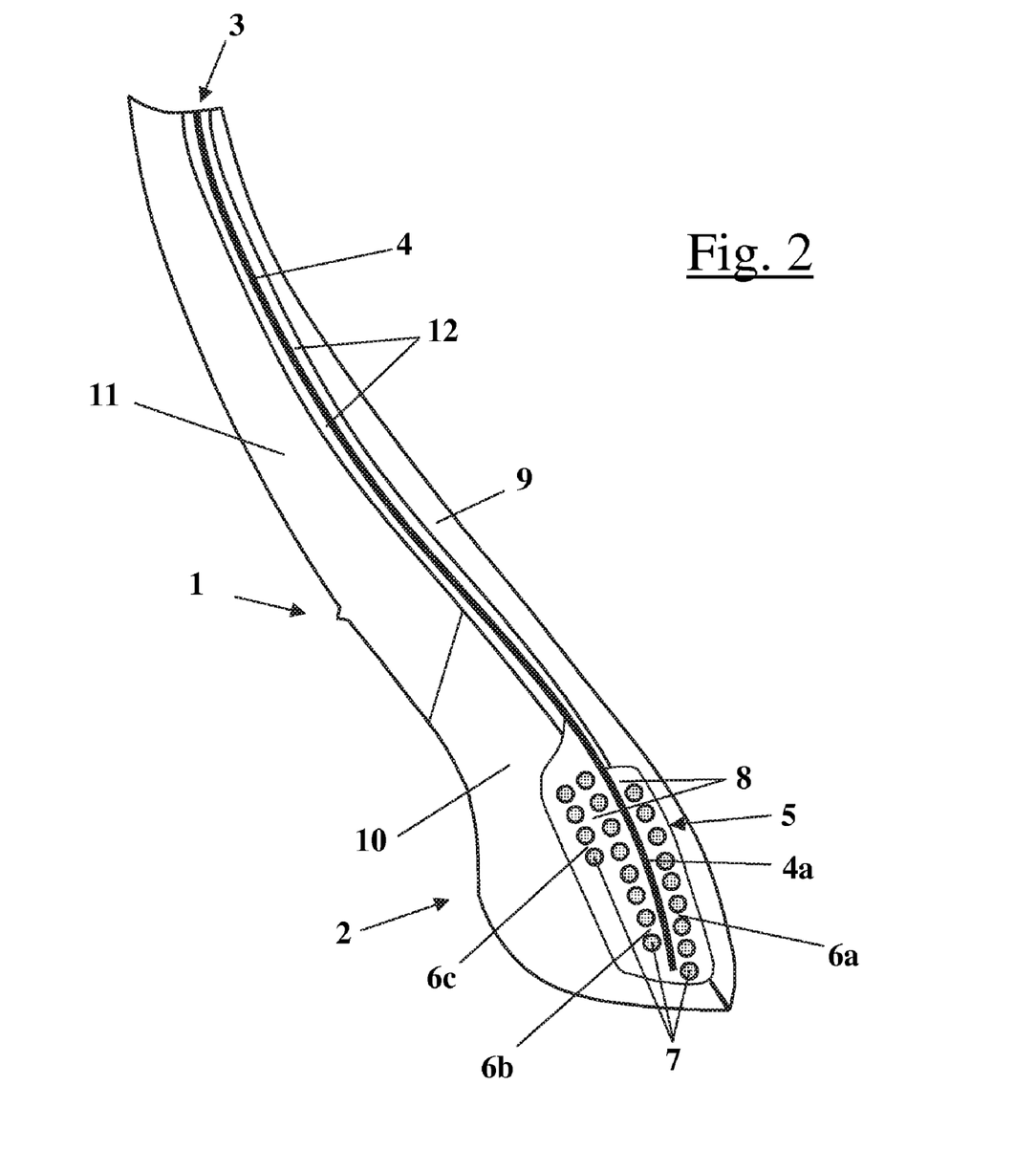

FIG. 2 depicts a partial cross-section through another possible example of a tire, the anchoring zone 5 of which comprises the same anchoring rubber 8 but three circumferential stacks 6a, 6b and 6c of anchoring cable 7 of construction 4+9, according to the invention. The total number of these cables lies for example within a range from 15 to 30 approximately, for the three stacks 6a, 6b and 6c together.

By way of example, the average inter-cable (or inter-winding) distance is of the order of 0.3 mm, the average inter-stack distance (between stacks 6b and 6c in this FIG. 2) is of the order of 0.5 mm and the minimum distance (to avoid any direct contact between the textile and metal) between the length 4a and each of the two stacks 6a and 6b is of between 0.5 and 0.8 mm.

Other possible variant embodiments of the tire of the invention will consist for example of using a plurality of lengths 4a of radial reinforcing members 4 in the anchoring zone 5 of the bead 2, or a plurality of alignments 4 of radial reinforcing members in the same carcass reinforcement 3, including in the sidewall 1, or even alternatively a plurality of carcass reinforcements 3 in this sidewall 1.

Another possible variant embodiment will consist of non-linear anchoring such as described in the aforementioned application WO-A-2004/009380.

In another possible variant embodiment of the invention, taken alone or in combination with at least one of the variants previously described, the individual radial reinforcing members 4 could of course be replaced by groupings of several parallel radial reinforcing members, grouped together for example in the form of rubberised strips reinforced by said radial reinforcing members, as described for example in application EP-A-919 406.

In non-limitative manner, it should be noted that the tires according to the invention may advantageously be manufactured using a process which does not involve any, or only a few, transformations of forms in the uncured state. For example, the blank of the future tire can be assembled on a rigid core which imposes the form of its inner cavity. There are applied to this core, in the order required by the final architecture, all the individual constituents of the tire, which are arranged directly in their final position, no portion of the tire later being displaced or folded over against another, as is generally the case in conventional assembly methods. This manufacture may in particular use the devices described in patent specifications EP-A-243 851 (or U.S. Pat. No. 4,795, 523) for laying the radial reinforcing members of the carcass reinforcement and EP-A-264 600 (or U.S. Pat. No. 4,963, 207) for laying the rubbers or rubber compositions. The tire can then be moulded and vulcanised as set forth for example in patent specification EP-A-242 840 (or U.S. Pat. No. 4,895, 692).

III. EXAMPLES OF EMBODIMENT OF THE INVENTION

III-1. Anchoring Cables

To produce the following examples of embodiment, cylindrical layered cables of different constructions, 4+9 and 2+7, in accordance with or not in accordance with the invention depending on the case, formed of fine carbon steel wires coated with brass are used.

The carbon steel wires are prepared in known manner, starting, for example, from machine wires (diameter 5 to 6 mm) which are first of all work-hardened, by rolling and/or drawing, to an intermediate diameter close to 1 mm, or alternatively starting directly from commercial intermediate wires, the diameter of which is close to 1 mm. The steel used is a carbon steel of the high-strength type (referred to as HT for "High Tensile"), the carbon content of which is approximately 0.82%, comprising approximately 0.5% manganese, the remainder consisting of iron and the usual inevitable impurities linked to the manufacturing process for the steel (for example, contents of silicon: 0.25%; phosphorus: 0.01%; sulphur: 0.01%; chromium: 0.11%; nickel: 0.03%; copper: 0.01%; aluminum: 0.005%; nitrogen: 0.003%).

The wires of intermediate diameter undergo a degreasing and/or pickling treatment before their subsequent transformation. After depositing a brass coating on these intermediate wires, what is called "final" work-hardening is effected on each wire (i.e. after the final heat treatment of patenting), by cold-drawing in a wet medium with a drawing lubricant which is for example in the form of an aqueous emulsion or dispersion.

The cords thus prepared (referenced 20 in FIGS. 3 and 4), all of a diameter of approximately 0.35 mm, have the following mechanical properties:

| | |
|---|---|
| Breaking load: | 265N; |
| Young's modulus: | 210 GPa; |
| Tensile strength: | 2790 MPa; |
| Elongation at break: | 2.2% (Ae = 1.4% + Ap = 0.8%). |

These wires are then assembled in the form of different cylindrical layered cables, referenced C-I to C-V, the construction and the mechanical properties of which are given in Table 1.

TABLE 1

| Cable | Construction | $p_1$ (mm) | $p_2$ (mm) | Fm (daN) | Rm (MPa) | At (%) | Af (%) |
|---|---|---|---|---|---|---|---|
| C-I | 4 + 9 | 7.5 | 15.0 | 280 | 2210 | 5.9 | 5.7 |
| C-II | 4 + 9 | 5.0 | 10.0 | 305 | 2275 | 3.8 | 3.5 |
| C-III | 4 + 9 | 5.0 | 10.0 | 275 | 2105 | 6.5 | 6.2 |

TABLE 1-continued

| Cable | Construction | $p_1$ (mm) | $p_2$ (mm) | Fm (daN) | Rm (MPa) | At (%) | Af (%) |
|---|---|---|---|---|---|---|---|
| C-IV | 2 + 7 | 7.5 | 15.0 | 196 | 2275 | 5.3 | 5.2 |
| C-V | 2 + 7 | 5.0 | 10.0 | 215 | 2425 | 3.4 | 3.2 |

The cables of construction [4+9], denoted C-I to C-III, are non-wrapped cables (without an external wrapping wire), and are formed of a total of thirteen wires 20, as illustrated in FIG. 3. They comprise an inner layer C of four wires 20 wound together in a helix (S direction) at the pitch $p_1$, this layer C1 being in contact with a cylindrical outer layer of nine wires 20 which themselves are wound together in a helix (S direction) around the core, at the pitch $p_2$.

The cable C-I (not in accordance with the invention) has conventional long pitches $p_1$ and $p_2$ ($p_1$=7.5 mm; $p_2$=15 mm); as the aforementioned application EP-A-751 015 teaches, it underwent a "high-elongation" treatment in order to impart thereto an operational elongation Af of greater than 4.0%.

Only cables C-II and C-III are in accordance with the invention, with short pitches $p_1$ and $p_2$ which satisfy the aforementioned relationships $4.0<p_1<7$ and $8<p_2<14$. The total elongation At of the cable C-II, which unlike the control cable C-I is not "high-elongation" treated, is advantageously greater than 3.0%. For comparison, the cable C-III, which is of the same construction as the cable C-II, furthermore underwent a high-elongation treatment, which imparts thereto an operational elongation Af and a total elongation At which are very high, since both are greater than 6.0%. This treatment consisted of heating the cable continuously during its travel, by induction under a protective atmosphere (for example hydrogen); the heating time was approximately 0.1 second, and the treatment temperature was 450° C. After the heating, the cable was cooled in a protective atmosphere ($H_2$) and then wound on a spool.

It is furthermore noted that these cables C-II and C-III according to the invention advantageously satisfy the following preferred relationships ($d_1$, $d_2$, $p_1$ and $p_2$ in mm):

$0.30<d_1=d_2<0.40$;
$4.5 \leq p_1 \leq 6.5$;
$8.5 \leq p_2 \leq 13.5$.

Figure 4:
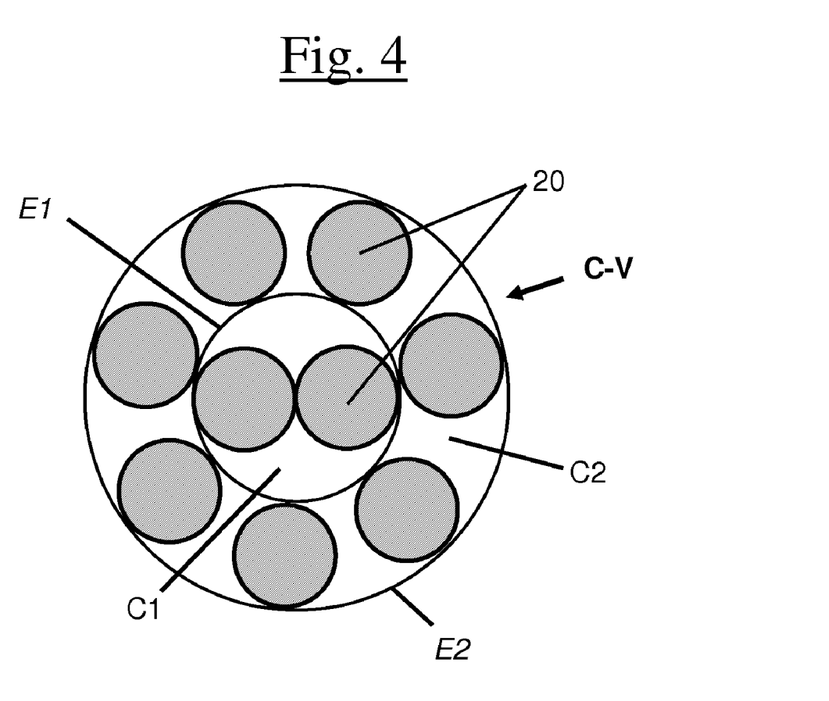
FIG. 4 shows a cross-section of cables of constructions 2+7 usable in the anchoring zone.

As for the other two control cables, of construction 2+7, C-IV and C-V, which are also non-wrapped, they are formed of a total of nine cords 20, as illustrated in FIG. 4. They comprise an inner layer C1 of two wires 20 wound together, in a helix (S direction) at the pitch $p_1$, this core being in contact with a cylindrical outer layer of seven wires 20 which themselves are wound together in a helix (S direction) around the core, at the pitch $p_2$. The cable C-IV has conventional long pitches $p_1$ and $P_2$ ($P_1$=7.5 mm; $P_2$=15 mm), and underwent a "high-elongation" treatment in order to impart thereto an elongation Af of greater than 4.0%. The cable C-V has short pitches $p_1$ and $p_2$ ($p_1$=5 mm; $P_2$=10 mm), it did not undergo a "high-elongation treatment".

III-2. Anchoring Rubber

For the following tests, the anchoring cables C-I and C-II on one hand, and C-IV and C-V on the other hand are associated with one and the same anchoring rubber of high rigidity in the cured stated (modulus E10 equal to approximately 55 MPa).

This anchoring rubber is a known composition based on diene elastomer (50/50 blend of NR and of SSBR having a Tg of approximately −50° C.), and of carbon black (approximately 75 phr) as reinforcing filler. Furthermore, it essentially comprises an antioxidant (approximately 2 phr), a reinforcing resin (approximately 10 phr of phenol-formaldehyde resin and 5 phr of methylene donor H3M), a metal salt (approximately 4 phr of cobalt naphthenate) as promoter of adhesion with respect to the metal, and finally a vulcanisation system (approximately 9 phr of sulphur, 1.5 phr of accelerator, 9 phr of ZnO and 1.5 phr of stearic acid).

III-3. Comparative Tests on Tires

The cables and anchoring rubbers above are used as anchoring structures for a carcass reinforcement of bead-wire-less tires having a radial carcass, of dimension 225/45 R17 (speed index Y), which are conventionally manufactured and identical in all points except for the construction of their anchoring zones 5.

These tires comprise in known manner a crown surmounted by a tread, a crown reinforcement and, referring now for example to the numbering of FIG. 1 or 2, two sidewalls 1 and two beads 2, a carcass reinforcement 3 which passes into the two sidewalls 2 and is anchored by means of anchoring means 5 (6a, 6b, 8) in the two beads 2. The carcass reinforcement 3 comprises at least one circumferential alignment of radial reinforcing members 4, which are arranged adjacent and practically parallel to one another, aligned circumferentially in at least one circumferential alignment from at least one of said beads 2 towards one of said sidewalls 1. The means 5 (6a, 6b, 8) for anchoring said radial reinforcing members 4 in at least one bead 2 comprise at least one circumferentially oriented anchoring cable 7, axially bordering said circumferential alignments of the radial reinforcing members 4 and cooperating with an adjacent portion of the carcass reinforcement 3 by means of an anchoring rubber 8 in contact with the anchoring cable 7 and the adjacent lengths 4a of the first radial reinforcing members 4. The anchoring cables 7 used in these tires are the cables C-I and C-II on one hand, and C-IV and C-V on the other hand, of Table 1.

The tires P-I, P-II, P-IV and P-V correspond to cables C-I, C-II, C-IV and C-V respectively. They comprise more precisely a bottom zone such as depicted in FIG. 1 with regard to tires P-I and P-II, with only 2 anchoring stacks 6a and 6b comprising in total 15 windings of cable 7, or in FIG. 2 with regard to the tires P-IV and P-V with in this case 3 anchoring stacks 6a, 6b and 6c comprising in total 21 windings of cable 7. In each of the anchoring stacks, the anchoring cables are arranged in a circumferential direction, parallel to one another, distant from one other by approximately 0.3 mm.

These tires, whether mounted or not on a rim of appropriate dimension according to the type of analysis carried out, were tested under static and dynamic conditions, on different rolling machines or other tests, in order to compare their performance in terms of the criteria defined below.

A) Endurance During Travel of Long Duration:

The endurance during travel is assessed by a running test of very long duration (40,000 km) on an automatic rolling machine, under a very heavy load (overload compared with the rated load) and at the same speed, for a predefined number of kilometres. If the tire reaches the end of the test without being destroyed, a maximum mark of 100 is assigned thereto; if not, its mark is reduced in proportion to the mileage travelled before destruction.

B) Endurance During High-Speed Travel:

The endurance during high-speed travel is assessed by subjecting each tire to a gradual increase in speed, in given stages, up to a limit speed set beforehand (greater than 300 km/h). If the tire reaches the end of the test without being destroyed, a maximum mark of 100 is assigned thereto; if not, its mark is reduced in proportion to the mileage travelled before destruction.

C) Mounting Ability (Ability to be Ovalised):

A mounting ability test is carried out in which the tire (not mounted on its rim) is gradually radially loaded to assess its ability to be ovalised, that is to say its deformability in its own plane.

The test is deliberately carried out under very harsh deformation conditions, until the structure of the bead buckles and at least one permanent deformation (bump visible to the naked eye) appears on the outside of the bottom zone of the tire. The higher the critical loading threshold, in other words the deflection withstood, the better is the deformability and the flexural strength of the bottom zone of the tire. A relative value of 100 is used for the control tire acting as a reference for the test (here, tire P-I), a higher value indicating an improved performance.

All the results obtained in these different tests have been summarised in Table 2 below.

TABLE 2

| Tire: | P-I | P-II | P-IV | P-V |
| --- | --- | --- | --- | --- |
| Anchoring cable: | C-I | C-II | C-IV | C-V |
| Endurance during travel of long duration: | 100 | 100 | 100 | 100 |
| Endurance during high-speed travel: | 100 | 100 | 100 | 100 |
| Mounting ability: | 100 | >200 | 104 | 150 |

It will be noted first of all that the tire P-II according to the invention exhibits an endurance during travel which is at least equal to that of the control tires (P-I, P-IV and P-V).

However, above all, unexpectedly, a result which is very substantially improved with regard to the mounting ability of the tire P-II reinforced with the cable according to the invention is observed compared:

not only with the control tires P-I and P-IV, the anchoring structure of which however uses cables of high elongation, which are high-elongation treated and therefore distinctly more expensive;

but also with the tire P-V using anchoring cables with short pitches but of a different construction which is not in accordance with the invention.

Only the tire P-II using the cable according to the invention exhibited excellent deformability, no permanent deformation having been observed, even under maximum loading of the tire. Furthermore, this tire P-II can be more easily warped (perimeter is more easily deformable) in the axial direction.

In summary, owing to the specific cable of the invention, the operations of mounting and demounting tires reinforced with the cable according to the invention, in particular on/from a monobloc wheel, can thus be carried out more simply and more quickly.

It is henceforth possible to use anchoring rubbers of great hardness, which are moreover beneficial to the road behaviour of the vehicles, without necessarily having to use high-elongation treated cables.

What is claimed is:

1. A metal cable having a construction 4+N and comprising:
   an inner layer C1 of 4 wires of diameter $d_1$ wound together in a helix at a pitch $p_1$, and
   an outer layer C2 of N wires of diameter $d_2$ wound together in a helix at a pitch $p_2$,
   wherein the inner layer C1 is surrounded by the outer layer C2, and
   wherein said cable has the following characteristics ($d_1$, $d_2$, $p_1$ and $p_2$ in mm):

$0.25 < d_1 < 0.40$;
$0.25 < d_2 < 0.40$;
$3.5 < p_1 < 7 < p_2 < 14$.

2. The cable according to claim 1, in which the wires of the layers C1 and C2 are of identical diameter ($d_1 = d_2$).

3. The cable according to claim 1, in which the layers C1 and C2 are wound in the same direction of twist.

4. The cable according to claim 1, in which the layer C2 comprises from 8 to 12 wires ($8 \leq N \leq 12$).

5. The cable according to claim 4, in which the layer C2 comprises from 8 to 10 wires ($8 \leq N \leq 10$).

6. The cable according to claim 1, in which the outer layer C2 is an unsaturated layer.

7. The cable according to claim 6, in which the cable has the construction 4+9.

8. The cable according to claim 1, having the following characteristics ($d_1$, $d_2$, and $p_2$ in mm):
$0.30 < d_1 < 0.40$;
$0.30 < d_2 < 0.40$;
$4.0 < p_1 < 7$ and $8 < p_2 < 14$.

9. The cable according to claim 8, having the following characteristics:
$4.5 \leq p_1 \leq 6.5$ and $8.5 \leq p_2 \leq 13.5$.

10. The cable according to claim 1, wherein the metal of the metal cable is steel.

11. The cable according to claim 10, wherein the steel is a carbon steel.

12. The cable according to claim 11, wherein the carbon steel has a carbon content of between 0.1% and 1.2%.

13. The cable according to claim 12, wherein the carbon steel has a carbon content of between 0.5% and 1.1%.

14. The cable according to claim 13, wherein the carbon steel has a carbon content of between 0.6% and 1.0%.

15. The cable according to claim 1, wherein a total elongation at break (At) of the cable is greater than 2.5%.

16. The cable according to claim 15, wherein the total elongation at break (At) is greater than 3.0%.

17. The cable according to claim 16, wherein the total elongation at break (At) is greater than 3.5%.

18. The cable according to claim 1, wherein an operational elongation (structural and elastic) (Af) of the cable is greater than 4.0%.

19. The cable according to claim 18, wherein the operational elongation (Af) is greater than 5.0%.

20. The cable according to claim 19, wherein the operational elongation (Af) is greater than 6.0%.

* * * * *